Patented June 1, 1943

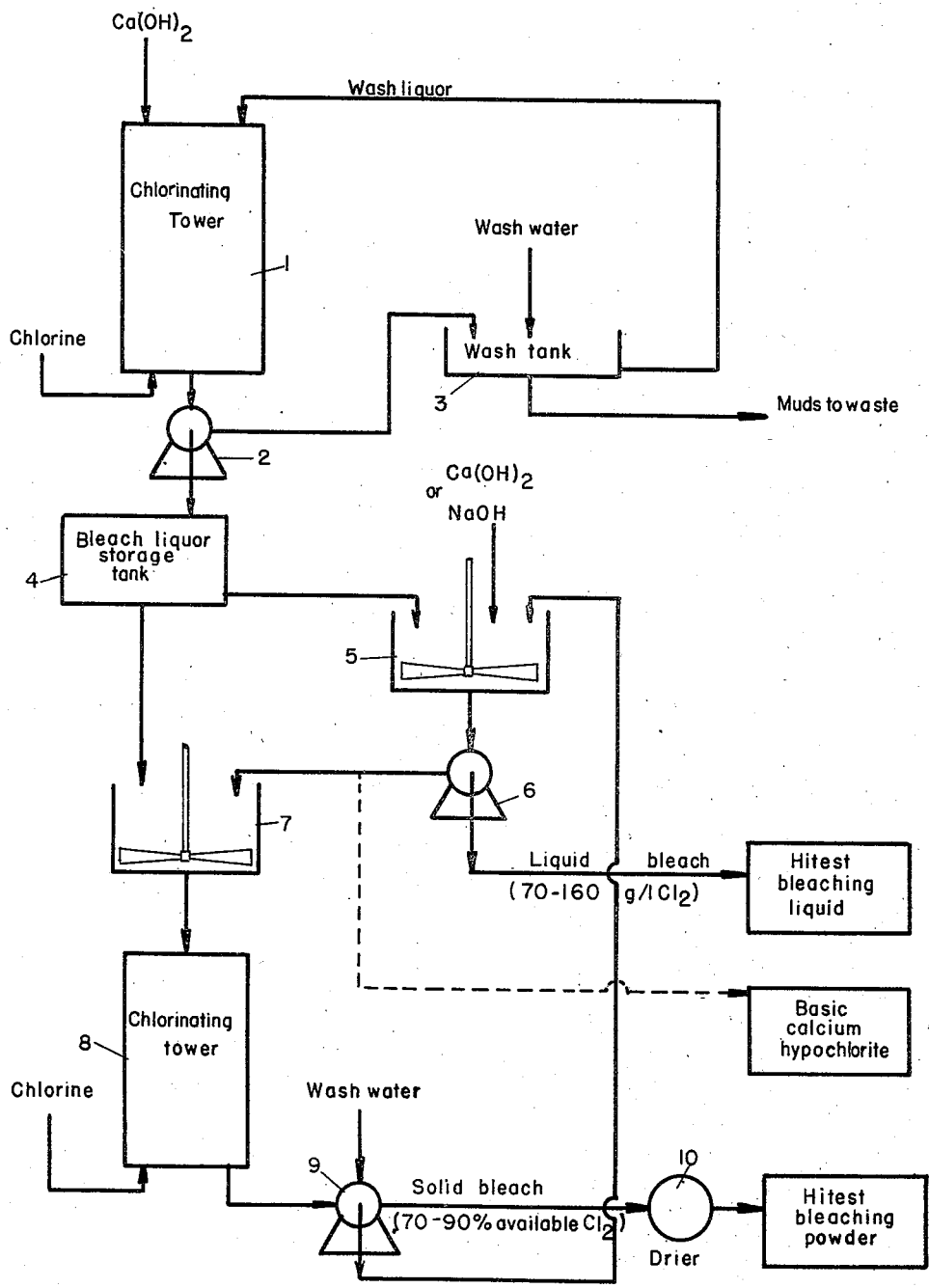

2,320,635

UNITED STATES PATENT OFFICE 2,320,635

MANUFACTURE OF HIGH TEST BLEACH

Francis C. Mericola and Howard F. Roderick, Wyandotte, Mich., assignors, by mesne assignments, to Wyandotte Chemicals Corporation, Wyandotte, Mich., a corporation of Michigan Application January 23, 1940, Serial No. 315,226

21 Claims. (Cl. 23—86)

The present invention relates to a process of manufacturing high test bleaching powder and high strength bleach liquor, both as products of one and the same process. In addition, basic calcium hypochlorite is produced in the process system, which may also be withdrawn therefrom as a product. The commercial manufacture of bleaching powder or bleach liquor, consisting primarily of calcium hypochlorite as the active ingredient, has, for many years, been practiced by the chlorination of lime. This operation involves the following fundamental chemical reaction:

$$2Ca(OH)_2 + 2Cl_2 \rightarrow Ca(OCl)_2 + CaCl_2 + 2H_2O$$

From the above equation, it will be seen that there is also formed calcium chloride, which is undesirable in the final product, since it not only reduces the amount of available chlorine therein, whether in liquid or powder form, but also in the case of bleach powder, calcium chloride being hygroscopic, absorbs water tending to hydrolize the calcium hypochlorite, reducing the strength of the latter. Such hygroscopic properties in the bleach powder, due to the presence of calcium chloride, are also undesirable in that they produce a caking of the powder.

It, therefore, has been a constant goal and object in the development of the art, to eliminate the amount of calcium chloride, or "chloride chlorine," as it is commonly called, in the final product. In instances where the amount of such chloride chlorine has been reduced to such an extent as to produce a final bleach powder having approximately over 65% available chlorine, the product has been termed in the art "high test bleach."

One general type of procedure for eliminating the amount of calcium chloride or chloride chlorine from the final bleach product has been by the transformation of the normal calcium hypochlorite into its basic form, represented by the formula:

$$Ca(OCl)_2.XCa(OH)_2$$

and with a subsequent chlorination of this basic calcium hypochlorite compound to produce the normal hypochlorite.

This last indicated general procedure was probably first taught in U. S. Patent No. 934,467, wherein milk of lime was first chlorinated to form normal calcium hypochlorite, the basic hypochlorite then precipitated by the addition of excess lime, and chlorination continued to produce the normal hypochlorite, and without separating the precipitated basic compound.

Further improvements and developments upon this type of procedure are taught in U. S. Patents Nos. 1,713,669, 1,754,473, 1,937,230 and 2,007,429.

The step of chlorinating the basic calcium hypochlorite involves the following chemical reaction:

$$Ca(OCl)_2.2Ca(OH)_2 + 2Cl_2 \rightarrow 2Ca(ClO)_2 + CaCl_2 + 2H_2O$$

The chlorination must, of course, be performed upon the basic calcium hypochlorite compound while the latter is in solution, usually in the form of a suspension or a slurry. Heretofore, and particularly in the above-mentioned prior patents, it has been deemed necessary to, in some way or manner, dilute the mother liquor which serves as the vehicle for the basic hypochlorite compound, in order to obtain proper yields. Quite to the contrary, we have discovered that such a dilution of the mother liquor is a distinct disadvantage, and that by virtue of maintaining a saturated solution concentration of the normal hypochlorite in the mother liquor, in which the chlorination of the basic hypochlorite compound is accomplished, that yields of the normal compound can be obtained approaching 100% of the theoretical, and in actual commercial practice of the invention, a final dried bleach powder product can be obtained having strengths ranging from 80 to 90% available chlorine. Such a high percentage of yield or alternatively, a bleach product of commensurate high test and strength, has not heretofore been commercially achieved.

Our invention possesses the further advantage in that high strength bleach liquor, high test bleach powder, and basic calcium hypochlorite, can be produced as final products from one and the same process; that materials discarded from the process system as waste are reduced to a minimum, thus decreasing the cost of production; that the excess alkalinity, and thus the stability, of the final dried bleach powder product can be simply and conveniently controlled by the extent of chlorination of the basic hypochlorite compound, and without the addition of other reagents; and finally, in that the mother liquor from both the preliminary chlorination for first producing the normal calcium hypochlorite solution or bleach liquor, and the mother liquor from the second chlorination of the basic hypochlorite compound, are both retained and utilized in the process system.

Our invention possesses the further advantage in that it renders possible the utilization of cheap, low-grade lime as a starting product, and with the production of a high quality, high test bleach powder final product.

Additional advantages of the invention shall become apparent during the course of the following description.

To the accomplishment of the foregoing and related ends, said invention, then, consists of the means hereinafter fully described and particularly pointed out in the claims. The annexed drawing and the following description set forth in detail one process and one product exemplifying our invention, such disclosed procedure and product constituting, however, but one of various applications of the principle of our invention. Said annexed drawing is a flow sheet, diagrammatically illustrating the steps and operations of a process embodying the principle of our invention.

Lime, Ca(OH)$_2$, is chlorinated in the chlorinating tower 1. For economical purposes, the lime used may be in the form of a lime slurry made from a cheap, low-grade 70% active lime. The chlorination is carried out in the chlorinating tower 1 until the solution is saturated with respect to calcium hypochlorite (Ca(ClO)$_2$). This solution is then passed through the filter 2 from which the filtrant, composed of insoluble mineral materials, such as carbonates and silicates, otherwise known as "muds," are removed to the wash tank 3, where they are further washed with water, and the wash liquor therefrom returned to the chlorinating tower 1 in order to make up a further amount of lime slurry. The washed muds, of course, are conducted to waste.

The filtrate from the filter 2, which is a saturated solution of calcium hypochlorite and calcium chloride, is led to the bleach liquor storage tank 4, where it is separated into two portions. One portion is led to the reaction and mixing tank 5, where di-basic calcium hypochlorite is precipitated from the solution, preferably by the addition of an alkali metal or alkaline earth hydroxide, and according to either one of the following two chemical equations:

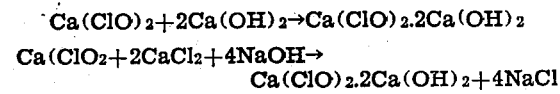

The precipitation of the di-basic calcium hypochlorite in the reaction tank 5 is preferably carried out at temperatures below 35° C. This temperature range condition has been found to promote the concentration of the normal calcium hypochlorite in solution, as well as the yield of di-basic calcium hypochlorite. The sodium or calcium hydroxide added to the reaction tank 5 should be of high purity and highly active in order to obtain the best results and a minimum amount of inert material in the final bleach product.

The basic hypochlorite is separated in the filter 6 from the mother liquor from the reaction tank 5. The filtrate from the filter 6 constitutes a high strength liquid bleach, having 70 to 160 grams per liter of available chlorine, depending upon the extent of precipitation of basic calcium hypochlorite from the bleach liquor introduced to the reaction tank 5. The liquid bleach filtrate from the filter 6 is thus a final product of the process which is removed at this point.

The filtrant, comprising a very pure and highly active basic calcium hypochlorite (a portion of which may be removed from the system as a final product, if required), is then led to the mixing tank 7 where it is mixed with the remaining portion of the saturated solution bleach liquor from the storage tank 4. This mixture is then conducted to the second chlorinating tower 8, where the di-basic calcium hypochlorite is converted into normal calcium hypochlorite and according to the chemical equation hereinabove mentioned. Theoretically, all of the basic hypochlorite compound is converted into normal calcium hypochlorite because the solution from which it is precipitated, or the mother liquor which is the vehicle in which the basic compound is carried, is already saturated with respect to normal calcium hypochlorite. However, since some alkalinity is desired in the finished product in order to maintain its stability, the chlorination in the chlorinating tower 8 is preferably not continued until total conversion of the basic hypochlorite, but to approximately a 95% conversion. Thus, as the slurry from the chlorinating tower 8 is passed through the filter 9, the filtrant or solid product issuing therefrom will comprise approximately 95% normal calcium hypochlorite and 5% di-basic calcium hypochlorite, thus imparting a slight excess alkalinity in the final product, which results after the filtrant from the filter 9 is dried in a suitable manner, such as by passing through the drier 10.

Wash water is introduced to the filter 9, removing occluded mother liquor from the solid material or filtrant. The mother liquor from the filter 9, which contains a high percentage of calcium chloride, as well as being saturated with respect to calcium hypochlorite, is then returned to the reaction tank 5 of the process system, where it can be quite suitably employed, due to its high concentration of salts, and thus, not substantially effecting any dilution of the solutions subsequently used in the process.

It will thus be seen that the above-described process produces both high strength bleaching liquid and high test bleaching powder as final products, and with a minimum of waste material. Furthermore, the bleaching liquid product of our process has proven to be much more stable than one of comparable strength made by the direct chlorination of lime. Such improved stability permits the transportation or storage of the bleach liquor product for relatively extended periods of time, and without any substantial loss of available chlorine content.

The available chlorine strength of the bleach liquor product of our process may be varied from 70 to 160 grams per liter, depending upon the amount of high test bleach powder product desired to be produced by the process. Thus, the process possesses an unusual attribute of flexibility in relative amounts in the production of both liquid and solid product. Either the liquid or the solid product can, therefore, be produced in predominance according to demand.

Temperatures of below 35° C. are utilized in all stages and operations of the above-described process, not only to promote high yields and in order to maintain high solution concentrations, but also to avoid the formation of undesirable chlorates.

The following example is illustrative of our process in actual operation:

1. 2160 gallons of a 70% active lime slurry carrying 167 g. p. l. active Ca(OH)$_2$ is chlorinated. At the endpoint, which is apparent to anyone skilled in the art, the chlorination is stopped and the bleach slurry is filtered. Approximately 2050 gallons of a 160 g. p. l. available chlorine bleach liquor is obtained.

The muds removed as the filtrant from this bleach slurry are washed with water in order to recover any occluded mother liquor and used to make up more of the lime slurry, any chlorine loss thus being substantially reduced to a minimum.

2. To 1200 gallons of the bleach liquor filtrate from step 1 are added 560 lbs. of NaOH (approximately 80 gallons 50% NaOH) and the resulting basic hypochlorite slurry is filtered, yielding approximately 1075 gallons of bleach liquor of 110 g. p. l. available chlorine, which volume contains substantially 1000 lbs. of available chlorine as bleach liquor.

3. The filter cake from 2 is mixed with the remaining 850 gallons of bleach liquor from 1 which is practically saturated with respect to $Ca(ClO)_2$. The resulting slurry is treated with approximately 450 lbs. of $Cl_2$ and filtered again. The filter cake is washed with water and the combined mother liquor and wash water saved and used in step 2 in the cycle. The filter cake is dried by suitable means, yielding 1000 lbs. of bleach powder of from 75 to 90% $Ca(ClO)_2$, depending upon the amount of wash water used.

Other modes of applying the principle of our invention may be employed instead of the one explained, change being made as regards the product and process herein disclosed, provided the step or steps stated by any of the following claims or the equivalent of such stated step or steps be employed.

We, therefore, particularly point out and distinctly claim as our invention:

1. In the manufacture of high test bleach, the steps of chlorinating a solution carrying basic calcium hypochlorite and saturated with respect to normal calcium hypochlorite, all of the normal calcium hypochlorite present being in solution, and then separating out the precipitated normal calcium hypochlorite.

2. In the manufacture of high test bleach, the steps of mixing precipitated basic calcium hypochlorite with a filtered solution saturated with normal calcium hypochlorite, all of the normal calcium hypochlorite present being in solution, and then chlorinating the resultant mixture to produce a precipitated normal calcium hypochlorite product.

3. In the manufacture of high test bleach, the steps of chlorinating a solution carrying basic calcium hypochlorite and saturated with respect to normal calcium hypochlorite, all of the normal calcium hypochlorite present being in solution, then separating out the precipitated normal calcium hypochlorite, and controlling the amount of chlorination short of total conversion of basic calcium hypochlorite, thereby regulating the amount of excess alkalinity in the resultant normal calcium hypochlorite product.

4. In the manufacture of high test bleach, the steps of mixing precipitated basic calcium hypochlorite with a filtered solution saturated with normal calcium hypochlorite, all of the normal calcium hypochlorite present being in solution, then chlorinating the resultant mixture to produce a precipitated normal calcium hypochlorite product, and controlling the amount of chlorination short of total conversion of basic calcium hypochlorite, thereby regulating the amount of excess alkalinity in the resultant normal calcium hypochlorite product.

5. In the manufacture of high test bleach, the steps of providing a solution of chlorinated lime, saturated with respect to normal calcium hypochlorite, all of the normal calcium hypochlorite present being in solution, separating a portion of such solution, and precipitating basic calcium hypochlorite from said portion, removing said precipitated basic calcium hypochlorite from its mother liquor, mixing the remaining portion of said solution of chlorinated lime with said removed basic calcium hypochlorite, and then chlorinating the resultant mixture to produce a precipitated normal calcium hypochlorite product.

6. In the manufacture of high test bleach, the steps of providing a solution of chlorinated lime, saturated with respect to normal calcium hypochlorite, all of the normal calcium hypochlorite present being in solution, separating a portion of such solution, and precipitating basic calcium hypochlorite from said portion, removing said precipitated basic calcium hypochlorite from its mother liquor, mixing the remaining portion of said solution of chlorinated lime with said removed basic calcium hypochlorite, then chlorinating the resultant mixture to produce a precipitated normal calcium hypochlorite product, and controlling the amount of chlorination short of total conversion of basic calcium hypochlorite, thereby regulating the amount of excess alkalinity in the resultant normal calcium hypochlorite product.

7. In the manufacture of high test bleach, the steps of providing a solution of chlorinated lime, saturated with respect to normal calcium hypochlorite, all of the normal calcium hypochlorite present being in solution, separating a portion of such solution, adding an alkaline hydroxide to said portion to precipitate basic calcium hypochlorite therefrom, removing said precipitated basic calcium hypochlorite from its mother liquor, mixing the remaining portion of said solution of chlorinated lime with said removed basic calcium hypochlorite, and then chlorinating the resultant mixture to produce a precipitated normal calcium hypochlorite product.

8. In the manufacture of high test bleach, the steps of providing a solution of chlorinated lime, saturated with respect to normal calcium hypochlorite, all of the normal calcium hypochlorite present being in solution, separating a portion of such solution, adding lime to said portion to precipitate basic calcium hypochlorite therefrom, removing said precipitated basic calcium hypochlorite from its mother liquor, mixing the remaining portion of said solution of chlorinated lime with said removed basic calcium hypochlorite, and then chlorinating the resultant mixture to produce a precipitated normal calcium hypochlorite product.

9. In the manufacture of high test bleach, the steps of providing a solution of chlorinated lime, saturated with respect to normal calcium hypochlorite, all of the normal calcium hypochlorite present being in solution, separating a portion of such solution, adding sodium hydroxide to said portion to precipitate basic calcium hypochlorite therefrom, removing said precipitated basic calcium hypochlorite from its mother liquor, mixing the remaining portion of said solution of chlorinated lime with said removed basic calcium hypochlorite, and then chlorinating the resultant mixture to produce a precipitated normal calcium hypochlorite product.

10. In the manufacture of high test bleach, the steps of providing a solution of chlorinated lime, saturated with respect to normal calcium hypochlorite, all of the normal calcium hypochlorite present being in solution, separating a portion of such solution, and precipitating basic calcium hypochlorite from said portion, removing said precipitated basic calcium hypochlorite from its mother liquor, mixing the remaining portion of said solution of chlorinated lime with said removed basic calcium hypochlorite, then chlorinating the resultant mixture to produce a precipitated normal calcium hypochlorite product, separating out said precipitated normal calcium hypochlorite and returning the mother liquor therefrom to be mixed with a portion of said chlorinated lime solution.

11. In the manufacture of high test bleach, the steps of providing a solution of chlorinated lime, saturated with respect to normal calcium hypochlorite, all of the normal calcium hypochlorite present being in solution, separating a portion of such solution, adding an alkaline hydroxide to said portion to precipitate basic calcium hypochlorite therefrom, removing said precipitated basic calcium hypochlorite from its mother liquor, mixing the remaining portion of said solution of chlorinated lime with said removed basic calcium hypochlorite, then chlorinating the resultant mixture to produce a precipitated normal calcium hypochlorite product, separating out said precipitated normal calcium hypochlorite and returning the mother liquor therefrom to be mixed with a portion of said chlorinated lime solution.

12. In the manufacture of high test bleach, the steps of providing a solution of chlorinated lime, saturated with respect to normal calcium hypochlorite, all of the normal calcium hypochlorite present being in solution, separating a portion of such solution, adding lime to said portion to precipitate basic calcium hypochlorite therefrom, removing said precipitated basic calcium hypochlorite from its mother liquor, mixing the remaining portion of said solution of chlorinated lime with said removed basic calcium hypochlorite, then chlorinating the resultant mixture to produce a precipitated normal calcium hypochlorite product, separating out said precipitated normal calcium hypochlorite and returning the mother liquor therefrom to be mixed with a portion of said chlorinated lime solution.

13. In the manufacture of high test bleach, the steps of providing a solution of chlorinated lime, saturated with respect to normal calcium hypochlorite, all of the normal calcium hypochlorite present being in solution, separating a portion of such solution, adding sodium hydroxide to said portion to precipitate basic calcium hypochlorite therefrom, removing said precipitated basic calcium hypochlorite from its mother liquor, mixing the remaining portion of said solution of chlorinated lime with said removed basic calcium hypochlorite, and then chlorinating the resultant mixture to produce a precipitated normal calcium hypochlorite product, separating out said precipitated normal calcium hypochlorite and returning the mother liquor therefrom to be mixed with a portion of said chlorinated lime solution.

14. In the manufacture of high test bleach, the steps of providing a solution of chlorinated lime, saturated with respect to normal calcium hypochlorite, all of the normal calcium hypochlorite present being in solution, separating a portion of such solution, and precipitating basic calcium hypochlorite from said portion, removing said precipitated basic calcium hypochlorite from its mother liquor, removing said mother liquor from the process system as a bleach liquor product, mixing the remaining portion of said solution of chlorinated lime with said removed basic calcium hypochlorite, and then chlorinating the resultant mixture to produce a precipitated normal calcium hypochlorite product.

15. In the manufacture of high test bleach, the steps of providing a solution of chlorinated lime, saturated with respect to normal calcium hypochlorite, all of the normal calcium hypochlorite present being in solution, separating a portion of such solution, and precipitating basic calcium hypochlorite from said portion, removing said precipitated basic calcium hypochlorite from its mother liquor, removing said mother liquor from the process system as a bleach liquor product, mixing the remaining portion of said solution of chlorinated lime with said removed basic calcium hypochlorite, then chlorinating the resultant mixture to produce a precipitated normal calcium hypochlorite product, separating out said precipitated normal calcium hypochlorite and returning the mother liquor therefrom to be mixed with a portion of said chlorinated lime solution.

16. In the manufacture of high test bleach, the steps of providing a solution of chlorinated lime, saturated with respect to normal calcium hypochlorite, all of the normal calcium hypochlorite present being in solution, separating a portion of such solution, adding an alkaline hydroxide to said portion to precipitate basic calcium hypochlorite therefrom, removing said precipitated basic calcium hypochlorite from its mother liquor, mixing the remaining portion of said solution of chlorinated lime with said removed basic calcium hypochlorite, then chlorinating the resultant mixture to produce a precipitated normal calcium hypochlorite product, separating out said precipitated normal calcium hypochlorite, returning the mother liquor therefrom to be mixed with a portion of said chlorinated lime solution, and controlling the amount of chlorination short of total conversion of basic calcium hypochlorite, thereby regulating the amount of excess alkalinity in the resultant normal calcium hypochlorite product.

17. In the manufacture of high test bleach, the steps of providing a solution of chlorinated lime, saturated with respect to normal calcium hypochlorite, all of the normal calcium hypochlorite present being in solution, separating a portion of such solution, and precipitating basic calcium hypochlorite from said portion, removing said precipitated basic calcium hypochlorite from its mother liquor, removing said mother liquor from the process system as a bleach liquor product, mixing the remaining portion of said solution of chlorinated lime with said removed basic calcium hypochlorite, then chlorinating the resultant mixture to produce a precipitated normal calcium hypochlorite product, and controlling the amount of chlorination short of total conversion of basic calcium hypochlorite, thereby regulating the amount of excess alkalinity in the resultant normal calcium hypochlorite product.

18. In the manufacture of high test bleach, the steps of providing a solution of chlorinated lime, saturated with respect to normal calcium hypochlorite, all of the normal calcium hypochlorite present being in solution, separating a portion of such solution, adding an alkaline hydroxide to said portion to precipitate basic calcium hypochlorite therefrom, removing said precipitated basic calcium hypochlorite from its mother liquor, removing said mother liquor from the process system as a bleach liquor product, mixing the remaining portion of said solution of chlorinated lime with said removed basic calcium hypochlorite, then chlorinating the resultant mixture to produce a precipitated normal calcium hypochlorite product, separating out said precipitated normal calcium hypochlorite and returning the mother liquor therefrom to be mixed with a portion of said chlorinated lime solution.

19. In the manufacture of high test bleach, the steps of chlorinating lime to produce a bleach liquor solution, saturated with respect to normal calcium hypochlorite, all of the normal calcium hypochlorite present being in solution, filtering said solution and dividing the filtrate into two portions, precipitating basic calcium hypochlorite from one of said portions, filtering and mixing the filtrant therefrom with the other of said portions, and then chlorinating the resultant mixture to produce a precipitated normal calcium hypochlorite product.

20. In the manufacture of high test bleach, the steps of chlorinating lime to produce a bleach liquor solution, saturated with respect to normal calcium hypochlorite, all of the normal calcium hypochlorite present being in solution, filtering said solution and dividing the filtrate into two portions, precipitating basic calcium hypochlorite from one of said portions, filtering and mixing the filtrant therefrom with the other of said portions, then chlorinating the resultant mixture to produce a precipitated normal calcium hypochlorite product, filtering out said last-named product, and then mixing the filtrate therefrom with said one of said portions of said first-named filtrate.

21. In the manufacture of high test bleach, the steps of providing a solution of chlorinated lime, saturated with respect to normal calcium hypochlorite, all of the normal calcium hypochlorite present being in solution, separating a portion of such solution, adding an alkaline hydroxide to said portion to precipitate basic calcium hypochlorite therefrom, removing said precipitated basic calcium hypochlorite from its mother liquor, removing a portion of said basic calcium hypochlorite as a product from the process system, removing said mother liquor from the process system as a bleach liquor product, mixing the remaining portion of said solution of chlorinated lime with the remaining portion of basic calcium hypochlorite, then chlorinating the resultant mixture to produce a precipitated normal calcium hypochlorite product, separating out said precipitated normal calcium hypochlorite and returning the mother liquor therefrom to be mixed with a portion of said chlorinated lime solution.

FRANCIS C. MERICOLA.
HOWARD F. RODERICK.